A. X. WISSMAN.
SIDE CAR FOR BICYCLES.
APPLICATION FILED MAR. 11, 1918.
1,300,681.
Patented Apr. 15, 1919.
2 SHEETS—SHEET 1.
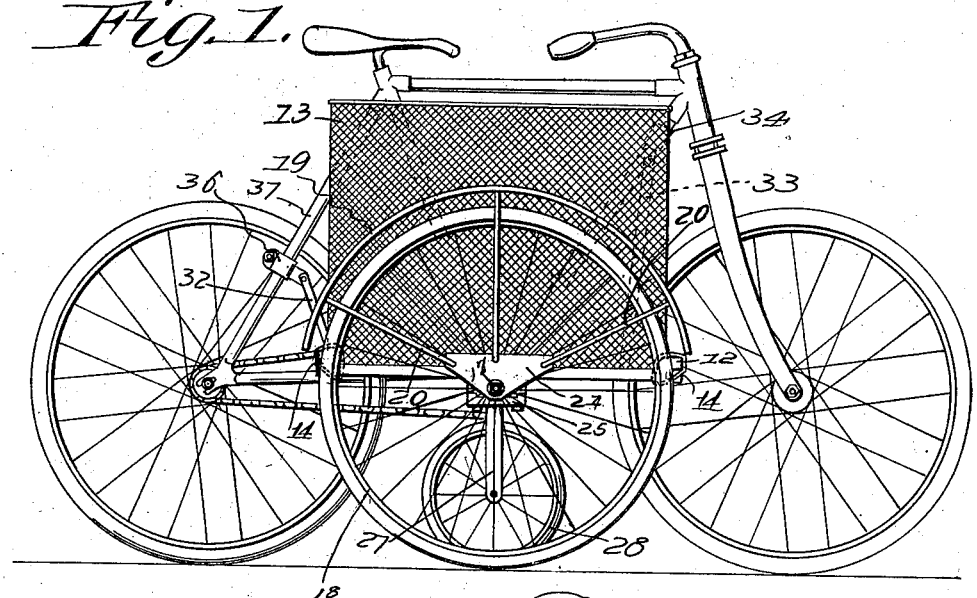
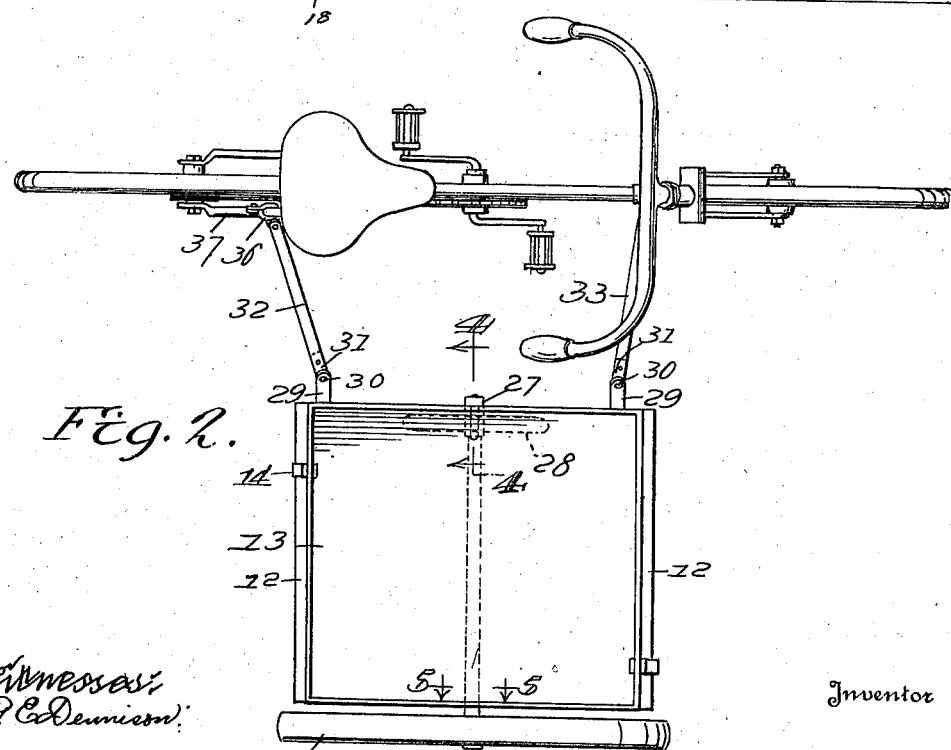

A. X. WISSMAN.
SIDE CAR FOR BICYCLES.
APPLICATION FILED MAR. 11, 1918.

1,300,681.

Patented Apr. 15, 1919.
2 SHEETS—SHEET 2.

Witnesses:

Inventor
Arthur X. Wissman,
By
Attorneys

UNITED STATES PATENT OFFICE.

ARTHUR X. WISSMAN, OF WEST HAVEN, CONNECTICUT.

SIDE CAR FOR BICYCLES.

1,300,681.  Specification of Letters Patent.  Patented Apr. 15, 1919.

Application filed March 11, 1918. Serial No. 221,772.

*To all whom it may concern:*

Be it known that I, ARTHUR X. WISSMAN, a citizen of the United States, residing at West Haven, in the county of New Haven, State of Connecticut, have invented certain new and useful Improvements in Side Cars for Bicycles; and I do hereby declare the following to be a full, clear, and exact description of the invention, such as will enable others skilled in the art to which it appertains to make and use the same.

This invention relates to new and useful improvements in side cars for bicycles or motorcycles, and is more particularly directed to the provision of a side-car of relatively light type, and adapted for carrying small packages of various natures.

It is in general the object of this invention to improve the structure, and increase the efficiency of structures of this nature, and it is more particularly an object to provide a side-car structure of exceedingly simple nature, consistent with a desired degree of strength, durability, and yieldable coaction with a bicycle or motorcycle to which it may be attached.

With the above and other objects and advantages in view, the invention resides more particularly in the novel combination, formation and arrangement of parts hereinafter described, and pointed out in the appended claims.

In the accompanying drawings:

Figure 1 is a side elevation view of the improved side-car attached to a bicycle.

Fig. 2 is a plan view of what is shown in Fig. 1.

Figure 3:
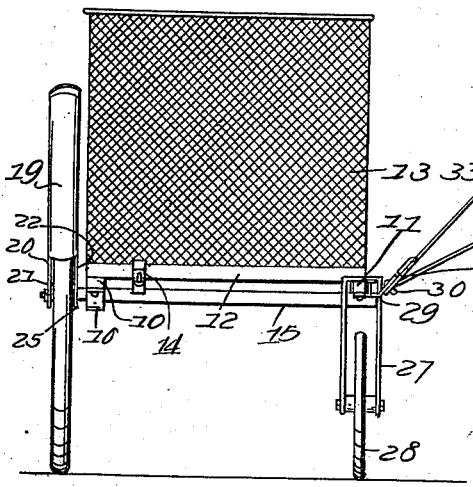
Fig. 3 is a front elevational view of the side car.
Figure 4:
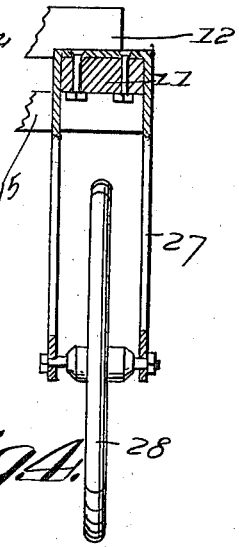
Fig. 4 is a detail sectional view on the line 4—4 of Fig. 2, and showing the mounting for the inner supporting wheel of the side-car.
Figure 5:
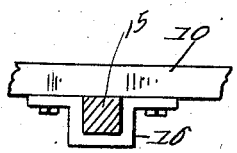
Fig. 5 is a sectional view through the side-car on the line 5—5 of Fig. 2.
Figure 6:
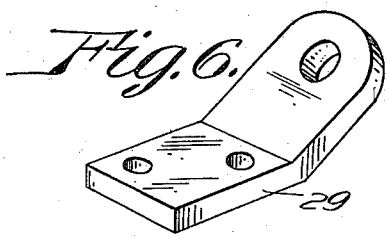
Fig. 6 is a perspective view of the connection between one of the attaching bars and the side-car.
Figure 7:
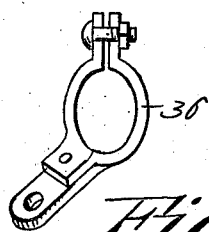
Fig. 7 is a perspective view of the connection between the rear attaching bar and the cycle frame.
Figure 8:
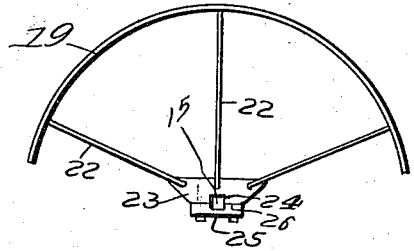
Fig. 8 is a detail sectional view through the side-car axle, and showing the inner mud-guard support for the main wheel thereof.

Referring now more particularly to the accompanying drawings there is provided a main frame comprising side bars 10 and 11 end bars 12 having their extremities extended under and secured to the extremities of the side bars. The body of the side-car comprises a receptacle 13 preferably formed of wire mesh to afford a desired lightness and strength, and of such shape in plan as to fit between the end bars 6 and sit on the side bars 5, this receptacle being detachably secured by straps 14 carried by the end bars and coupled about adjacent portions of the wire basket or receptacle. Extending transversely under the central portions of the side-bars 10 is an axle 15 preferably square in cross-section, and secured to the side bars by U-shaped plates 16 disposed about its adjacent portions and having their ends bolted to the side bars. One end of this axle extends slightly past the side bar 10 and carries a spindle 17 for the reception of an ordinary bicycle wheel 18, the resiliency of the pneumatic tire of this wheel affording a ground support which in the present type of structure obviates the necessity of springs between the axle and the body of the side-car.

To prevent splashing of mud over the basket 13, an arcuate shield 19 is disposed over the wheel 18 and is supported at its outer side by arms 20 extending radially of the wheel and secured to the upper portion of a plate 21 apertured to engage on the spindle 17. The inner side of the mud shield 19 is supported by arms 22 extending radially of the wheel 18 and secured to the upper portion of a plate 23 and a square recess 24 in its lower portion whereby said plate may fit about the squared axle end outwardly of the axle. For securement to said axle end a plate 25 is disposed thereunder and has upstanding ears 26 riveted to the plate 23 at the sides of its recess 24. The mounting for the mud guard is thus entirely independent of the removable body basket 13.

For supporting the inner side of the side car, in addition to the hereinafter described support afforded by its attachment to a cycle structure, a bar 27 is bent in U shape to afford a pair of wheel forks and has its bight portion disposed about and bolted to the side bar 11 adjacent the connection of the axle. Mounted in the lower ends of the fork is a wheel 28, which is of small diameter, and which is preferably formed of solid rubber to afford a desired resiliency, the sides of the wheel being taperingly inclined together from a relatively thick hub portion to afford a desired lightness of the wheel and a sufficient bracing against lateral yielding.

Secured to the end portions of the main frame sill and projecting laterally therefrom are a pair of plates 29 having their outer ends inclined upwardly at an angle of substantially 45 degrees and apertured for the loose reception of bolts 30 also passed through plates 31 carried on the ends of front and rear bars 32 and 33 respectively adapted to secure the side car to the frame of a bicycle or motorcycle. The rod 33 is longer than the rod 32 and is adapted for securement, by means of clip plates 34 bolted thereto, to preferably the front diagonal bar 35 of a cycle frame adjacent the front head thereof. The bar 32 has bolted thereto clip plates 36 for securement to one of the rear wheel forks 37 of the cycle frame at a point considerably lower than the attachment of the front connecting bar 33. The clips 36 of the rear bar 32 are particularly formed to coact with the oblong shape of the rear fork for clamping engagement therewith, while the clips 34 are semi-circular in their engaging portions for coaction with the circular front frame portion which they engage. Thus the attaching bars may be secured to the cycle frame in a substantially rigid manner.

By the loose connection between the plates 29 and the bars 32 and 33, a considerable degree of relative movement of the side car and cycle frame is afforded, while at the same time the side car is retained in its general desired position, a desired resilient yielding to various shocks incidental to travel being procured by slight flexures of the connecting bars 32 and 33. By reference particularly to Fig. 2, it is noted that in the attached position of the side car, the connecting bars, extend divergently to afford maximum strength against operative strains. It is further noted that the bars extend at different inclinations to the vertical, whereby a truss effect is procured in meeting upward stresses due to engagement of the side car with ground obstruction over which it travels.

What is claimed, is,

1. A side car comprising a frame, supporting wheels at the sides of the frame, plates secured to and extending outwardly from the side of the frame, bars adapted for securement to a cycle frame, plates on said bars, and bolts loosely passed through said plates and the frame carried plates.

2. A side car comprising side frame sills, end frame sills having their extremities disposed over and secured to the side sills, a receptacle adapted to detachably seat on the side sills and fit between the end sills, means for securing the receptacle in such seating position, an axle extended transversely under and secured to the side sills, a wheel on said axle and means for connecting the frame sills with a cycle frame.

3. A side car comprising side frame sills, end frame sills having their extremities disposed over and secured to the side sills, a receptacle adapted to detachably seat on the side sills and fit between the end sills, means for securing the receptacle in such seating position, an axle extended transversely under and secured to the side sills, a wheel on one end of the axle, a wheel support depending from the side sill adjacent the other end of the axle, a wheel carried by said support and means for connecting said side sill with the cycle frame.

In testimony whereof, I affix my signature, in the presence of two witnesses.

ARTHUR X. WISSMAN.

Witnesses:
 JOSEPH WISSMAN, Jr.,
 ANNA B. WISSMAN.